(12) United States Patent
Harris et al.

(10) Patent No.: US 12,435,689 B2
(45) Date of Patent: Oct. 7, 2025

(54) ENGINE WITH DIVERTER FOR HEAVY FUEL INJECTION

(71) Applicant: Northwest ULD, Inc., McMinnville, OR (US)

(72) Inventors: Chris Harris, McMinnville, OR (US); Greg Stadeli, McMinnville, OR (US)

(73) Assignee: NORTHWEST ULD, INC., McMinnville, OR (US)

( * ) Notice: Subject to any disclaimer, the term of this patent is extended or adjusted under 35 U.S.C. 154(b) by 0 days.

(21) Appl. No.: 18/412,001

(22) Filed: Jan. 12, 2024

(65) Prior Publication Data
US 2024/0247626 A1     Jul. 25, 2024

Related U.S. Application Data

(60) Provisional application No. 63/440,002, filed on Jan. 19, 2023.

(51) Int. Cl.
| | |
|---|---|
| *F02M 37/00* | (2006.01) |
| *F02B 61/04* | (2006.01) |
| *F02B 75/02* | (2006.01) |
| *F02M 61/14* | (2006.01) |

(52) U.S. Cl.
CPC ......... *F02M 37/0047* (2013.01); *F02B 61/04* (2013.01); *F02B 75/02* (2013.01); *F02M 61/14* (2013.01); *F02B 2075/025* (2013.01)

(58) Field of Classification Search
CPC .... F02M 37/0047; F02M 61/14; F02B 61/04; F02B 75/02; F02B 2075/025; F02B 75/18; F04B 39/128; B64C 27/26; B64C 39/024
See application file for complete search history.

(56) References Cited

U.S. PATENT DOCUMENTS

| | | | | |
|---|---|---|---|---|
| 5,653,103 | A * | 8/1997 | Katoh | F02M 25/089 60/283 |
| 5,657,724 | A * | 8/1997 | Brown | F02B 61/045 123/317 |
| 5,950,596 | A | 9/1999 | Kollmann | |
| 7,168,401 | B2 | 1/2007 | Johnson | |
| 9,581,113 | B2 * | 2/2017 | Bandyopadhyay | F02D 19/0647 |
| 11,255,321 | B1 | 2/2022 | Harris et al. | |
| 2002/0148419 | A1 | 10/2002 | Hironaka et al. | |
| 2006/0243230 | A1 | 11/2006 | Mavinahally et al. | |
| 2012/0240907 | A1 | 9/2012 | Watanabe et al. | |
| 2014/0061391 | A1 * | 3/2014 | Ffield | F02M 69/10 123/457 |

OTHER PUBLICATIONS

International Searching Authority, International Search Report and Written Opinion dated May 6, 2024 in PCT/US2020/011466.

* cited by examiner

*Primary Examiner* — Syed O Hasan
(74) *Attorney, Agent, or Firm* — SNELL & WILMER L.L.P (57) ABSTRACT

A crankcase for a UAV internal combustion engine, comprising a crankcase housing comprising a crankcase chamber, a fuel injection port extending through said crankcase housing to said crankcase chamber, and a fuel diverter comprising a diverting surface disposed within said crankcase chamber and aligned with said fuel injection port.

19 Claims, 11 Drawing Sheets

ENGINE WITH DIVERTER FOR HEAVY FUEL INJECTION

CROSS-REFERENCE TO RELATED APPLICATION

This application is a non-provisional of U.S. Provisional Application No. 63/440,002, entitled, "ENGINE WITH DIVERTER FOR HEAVY FUEL INJECTION," filed on Jan. 19, 2023. The contents of the above-noted application are incorporated by reference herein as if set forth in full and priority to this application is claimed to the full extent allowable under U.S. law and regulations.

FIELD

The present disclosure generally relates to the field of internal combustion engines and, more particularly, to the manner in which a heavy fuel is directed into such an engine.

SUMMARY

A crankcase for a UAV internal combustion engine is provided comprising a crankcase housing comprising a crankcase chamber, a fuel injection port extending through said crankcase housing to said crankcase chamber, and a fuel diverter comprising a diverting surface disposed within said crankcase chamber and aligned with said fuel injection port.

A UAV internal combustion engine is provided comprising a crankcase comprising a crankcase housing, wherein said crankcase housing comprises a crankcase chamber, a fuel injection port extending through said crankcase housing to said crankcase chamber, a fuel diverter comprising a diverting surface disposed within said crankcase chamber and aligned with said fuel injection port, a cylinder mounted to said crankcase housing, and a piston disposed within and movable relative to said cylinder, wherein said piston comprises a first piston surface and a second piston surface that are oppositely disposed, wherein said second piston surface fluidly interfaces with said crankcase chamber, wherein during operation said diverting surface directs fuel, discharged into crankcase chamber through said fuel injection port, at least generally in a direction of said second piston surface.

A UAV propulsion system is provided comprising an internal combustion engine comprising a crankcase comprising a crankcase housing, wherein said crankcase housing comprises a crankcase chamber, a fuel injection port extending through said crankcase housing to said crankcase chamber, a fuel diverter comprising a diverting surface disposed within said crankcase chamber and aligned with said fuel injection port, a cylinder mounted to said crankcase housing, and a piston disposed within and movable relative to said cylinder, wherein said piston comprises a first piston surface and a second piston surface that are oppositely disposed, wherein said second piston surface fluidly interfaces with said crankcase chamber, wherein during operation said diverting surface directs fuel at least generally in a direction of said second piston surface, and a propeller hub mounted to said crankshaft and adapted to receive a propeller.

DETAILED DESCRIPTION

Figure 1A:
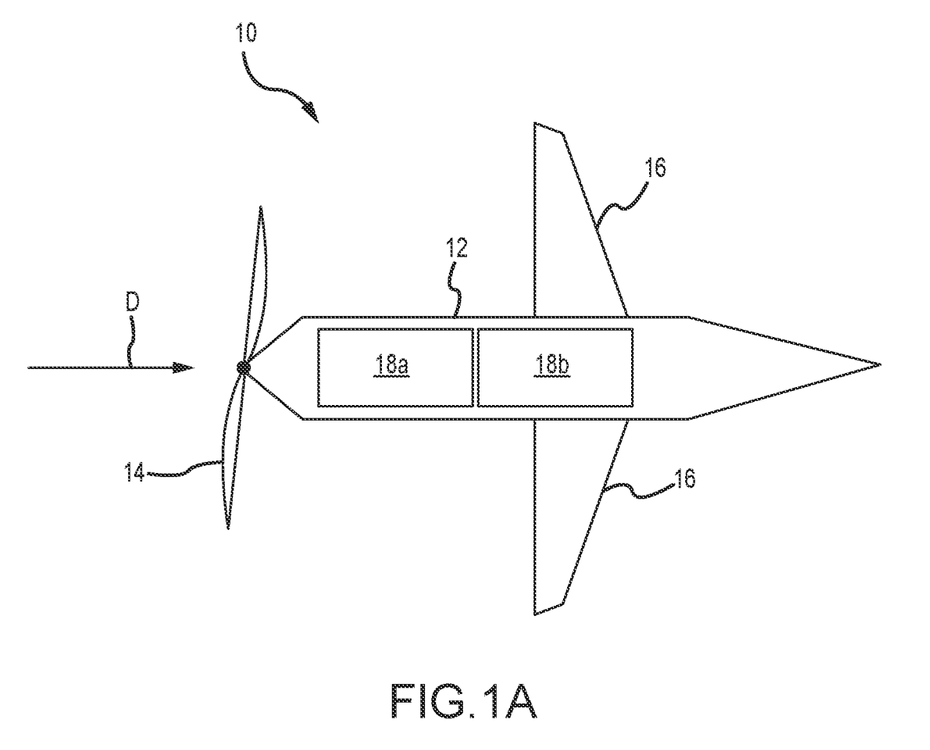
FIG. 1A is a schematic of a UAV in a push-type configuration.

FIG. 1A is a schematic of one embodiment of an unmanned aircraft system or unmanned aerial vehicle (hereafter "UAV 10"). The UAV 10 includes an airframe 12 having a pair of fixed wings 16, along with a propulsion system that includes a propeller 14, an engine 18a, and a propulsion unit control system 18b. Rotation of the propeller 14 (by operation of the engine 18a via the propulsion unit control system 18b) advances the UAV 10 in the direction indicated by the arrow D. The propeller 14 is incorporated by the airframe 12 such that the UAV 10 is of a push-type configuration (e.g., the airframe 12 is "pushed" by rotation of the propeller 14).

Figure 1B:
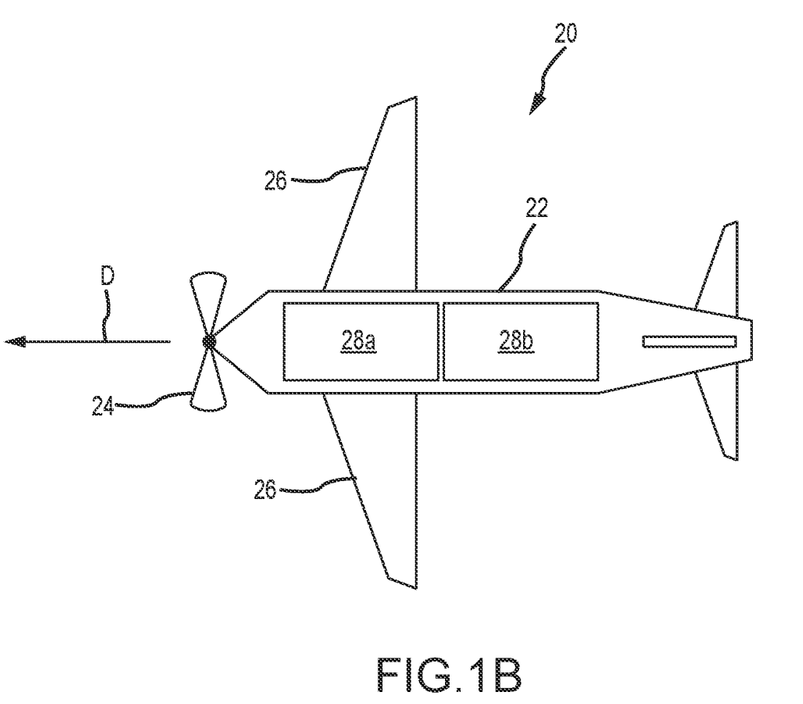
FIG. 1B is a schematic of a UAV in a pull-type configuration.

FIG. 1B is a schematic of another embodiment of an unmanned aircraft system or unmanned aerial vehicle (hereafter "UAV 20"). The UAV 20 includes an airframe 22 having a pair of fixed wings 26, along with a propulsion system that includes a propeller 24, an engine 28a, and a propulsion unit control system 28b. Rotation of the propeller 24 (by operation of the engine 28a via the propulsion unit control system 28b) advances the UAV 20 in the direction indicated by the arrow D. The propeller 24 is incorporated by the airframe 22 such that the UAV 20 is of a pull-type configuration (e.g., the airframe 22 is "pulled" by rotation of the propeller 24).

Figure 2A:
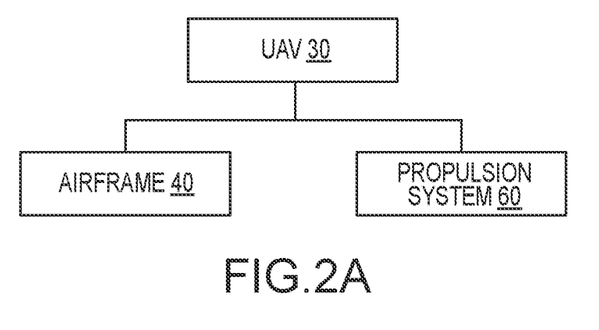
FIG. 2A is a functional schematic of a UAV.

A functional schematic of an unmanned aerial vehicle or UAV 30 is presented in FIG. 2A, as may be utilized by the fixed wing UAV embodiments of FIGS. 1A and 1B as well by rotary wing UAV configurations. There are two primary components of the UAV 30, namely an airframe 40 and a propulsion system 60 that is mounted to the airframe 40. The propulsion system 60 may be configured in a pull-type configuration or may be configured in a push-type configuration.

Figure 2B:
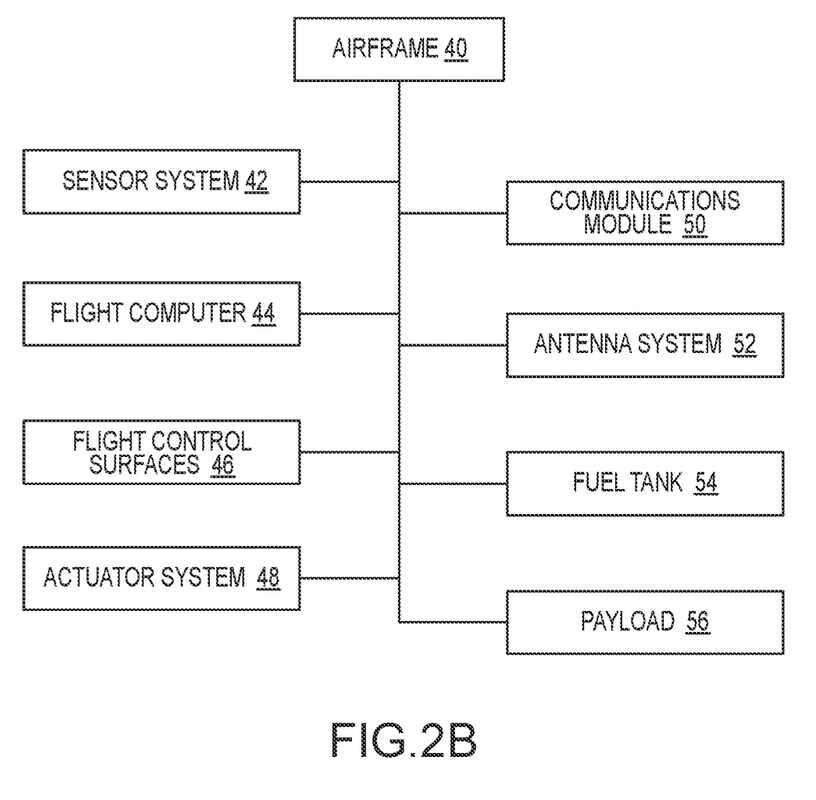
FIG. 2B is a functional schematic of an airframe for the UAV of FIG. 2A.

A representative functional schematic of the airframe 40 for the UAV 30 is presented in FIG. 2B. The airframe 40 may be of any appropriate configuration for the target application(s), and it includes what may be characterized as a number of subsystems. The illustrated subsystems for the airframe 40 include a sensor system 42, a flight computer or control system 44, at least one and typically multiple flight control surfaces/structures 46, an actuator system 48, a communications module 50, an antenna system 52, a fuel tank 54 for the case where the propulsion system 60 includes an internal combustion engine or the like, and typically a payload 56. The payload 56 may be of any appropriate type, such as a fixed or gimbaled video camera.

The sensor system 42 of the airframe 40 may be used to calculate/estimate the kinematic state of the UAV 30. Representative sensors for the sensor system 42 include a GPS antenna and receiver (to calculate/estimate the UAV 30 position and velocity in global coordinates), gyros and accelerometers (e.g., to calculate/estimate the attitude (pitch and roll) of the UAV 30), and magnetometers (e.g., to calculate/estimate yaw angle of the UAV 30). A UAV magnetometer may be characterized as measuring the position of the UAV 30, a UAV altimeter may be characterized as measuring the air speed and altitude of the UAV 30, and a UAV inertial unit may be characterized as measuring movements of the UAV 30, and each of which may be part of the sensor system 42. Other sensors may be used by the sensor system 42 to collect desired data for the target application(s). Data acquired by the sensor system 42, as well as any data acquired by the payload 56 (e.g., imagery), may be stored on the UAV 30 but more typically will be transmitted (e.g., wireless telemetry) to one or more off-board stations, remote controllers, or the like (e.g., a ground control station).

The flight computer 44 of the airframe 40 may be characterized as the "brain" of the airframe 40 or UAV 30, as it includes one or more processors and utilizing any appropriate processing architecture. The flight computer 44 may use data acquired by the sensor system 42 to estimate the current position and orientation of the UAV 30. The flight computer 44 may also be used to control the flight of the UAV 30 (e.g., via receipt of flight commands). In this regard, the flight computer 44 may provide a control signal(s) to the propulsion system 60 via a propulsion unit control system (e.g., in accord with the propulsion unit control system 18b of FIG. 1A or the propulsion unit control system 28b of FIG. 1B), as well as to translate flight commands into actuator commands that are sent to the actuator system 48 to adjust one or more of the flight control surfaces 46 of the UAV 30 or to simply transmit actuator commands to the actuator system 48 to adjust one or more of the flight control surfaces 46 of the UAV 30. In a fixed wing configuration of the UAV 30, these flight control surfaces 46 may include an elevator for controlling the pitch (a lateral axis) of the UAV 30, ailerons for controlling the roll (longitudinal axis) of the UAV 30, and a rudder for controlling the yaw (vertical axis) of the UAV 30. In a rotary wing configuration of the UAV 30, these flight control surfaces 46 may include one or more of its rotor blades. Finally, the flight computer 44 may be used to control operation of the payload 56.

The flight computer 44 may be configured with a flight control algorithm to provide for a programmed control of the flight of the UAV 30, may be configured to incorporate or interface with an autopilot system, the UAV 30 to be remotely controlled from one or more remote locations (remote meaning "off-board" the UAV 30), or a combination thereof. In this regard, the airframe 40 includes a communications module 50 and an antenna system 52 of any appropriate type to accommodate communication (e.g., wireless) between the UAV 30 and one or more off-board stations, remote controllers, or the like (e.g., a ground control station, an airborne control station, or both). The communications module 50 and antenna system 52 allow for receipt of flight commands from an off-board or remote controller(s), receipt of payload control commands from an off-board or remote controller(s), or both. As noted, the communications module 50 and antenna system 52 may also be used to transmit data (e.g., from the sensor system 42; from the payload 56) to one or more off-board stations, remote controllers, or the like.

Figure 2C:
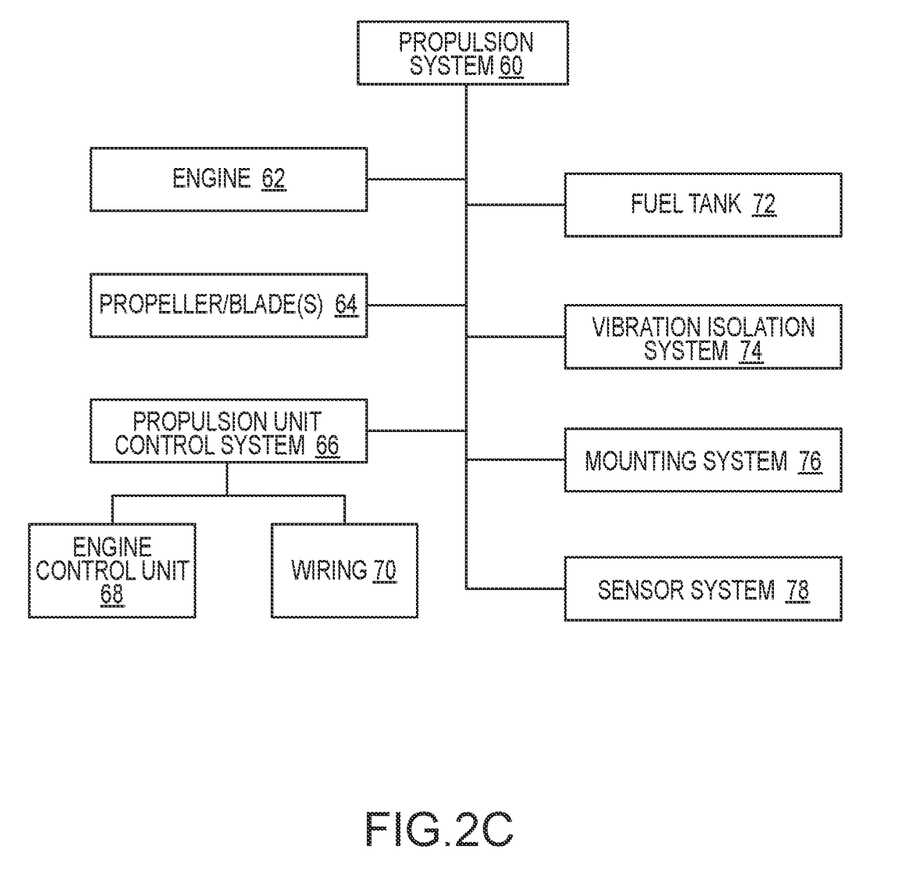
FIG. 2C is a functional schematic of a propulsion system for the UAV of FIG. 2A.

A representative functional schematic for the propulsion system 60 of the UAV 30 is presented in FIG. 2C. The propulsion system 60 may be configured in a pull-type configuration or may be configured in a push-type configuration. Components of the propulsion system 60 include an engine 62, at least one propeller or blade 64, a propulsion unit control system 66, a vibration isolation system 74, and a mounting system 76. The propulsion system 60 may be separately attached to the airframe 40 by its mounting system 76 (e.g., a mounting ring). The vibration isolation system 74 may be disposed between and structurally interconnect the mounting system 76 with the engine 62, for instance to vibrationally decouple the engine 62 from the airframe 40. The vibration isolation system 74 may also be characterized as being disposed between and structurally interconnecting the engine 62 and the propulsion unit control system 66 to prevent unintended vibration of the propulsion unit control system 66.

The engine 62 may be in the form of an internal combustion engine. An appropriate fuel may be contained within a fuel tank 72 of the propulsion system 60. The fuel tank 72 may be of a smaller capacity than the fuel tank 54 for the airframe 40 (FIG. 2B). The fuel tank 54 of the airframe 40 may be referred to as the primary fuel tank, while the fuel tank 72 of the propulsion system 60 may be referred to as an auxiliary fuel tank or a header tank. The UAV 30 may include one or more fuel tanks of any appropriate capacity and incorporated in any appropriate manner. The primary fuel tank (e.g., fuel tank 54) may be fluidically coupled to one or more auxiliary fuel tanks (e.g., header tank 72), and a pump or other appropriate apparatus may be used to convey fuel from the primary tank to the auxiliary fuel tank(s).

The propulsion unit control system 66 may be characterized as the "brain" of the propulsion system 60, may receive control signals from the flight computer 44 of the airframe 40, and includes one or more processors and utilizing any appropriate processing architecture. The propulsion unit control system 66 includes an engine control unit 68 (for controlling operation of the engine 62 and its associated components), as well as wiring 70 for the propulsion system 60. More specifically, the propulsion unit control system 66 may be used to send one or more control signals to actuator motors in order to adjust engine operation. This may include adjusting the degree of opening of an air inlet or cooling shroud(s) in response to engine temperature above or below a threshold temperature, or it may include adjusting the engine throttle in response to a demand for increased or decreased engine power.

The propulsion system 60 may also include a sensor system 78 that may be used to provide indications of engine operating parameters including, but not limited to, engine oil temperature, coolant temperature, engine rotational speed, cylinder head temperature, and throttle position. The propulsion unit control system 66 may then provide a control signal to associated actuator motors to control engine operation responsive to these inputs.

Engines for UAV propulsion systems may use what is characterized as a "heavy fuel." Representative heavy fuels for the propulsion system 100 include without limitation kerosene-based fuels, #1 diesel fuel, #2 diesel fuel, JP8, JP5, or Jet A/A1. Use of a heavy fuel for a UAV application may provide the benefit of lower fuel consumption, ease of transportation to and storage at remote locations in part because heavy fuel is less prone to unintended combustion, and cold start capability. Additionally, it is typically less expensive than other types of fuel, and heavy fuel is widely used in military/maritime industries and applications, and as UAVs become more widely used in these industries it is appropriate to also operate the UAVs using heavy fuel. Engines for UAV propulsion systems may also use petroleum-based fuels or gasoline as a fuel. Representative fuels for the propulsion system 100 would include without limitation gasoline fuels with octane ratings between 87 and 110.

Reference may be made to FIGS. 3A-3C and 4A-4C regarding an engine 100 for a propulsion system of a UAV (e.g., for use by the above-noted propulsion systems, UAVs, or both). The engine 100 is of a two-cycle configuration and further is configured to accommodate usage of a heavy fuel in accordance with the foregoing. Generally, a heavy fuel is injected into a crankcase and is then diverted or redirected at least generally toward a back side or surface of one or more pistons—this back side or surface is opposite of the surface of the piston that is exposed to combustion during operation of the engine 100. Advantages associated with this configuration are addressed below.

Figure 3A:
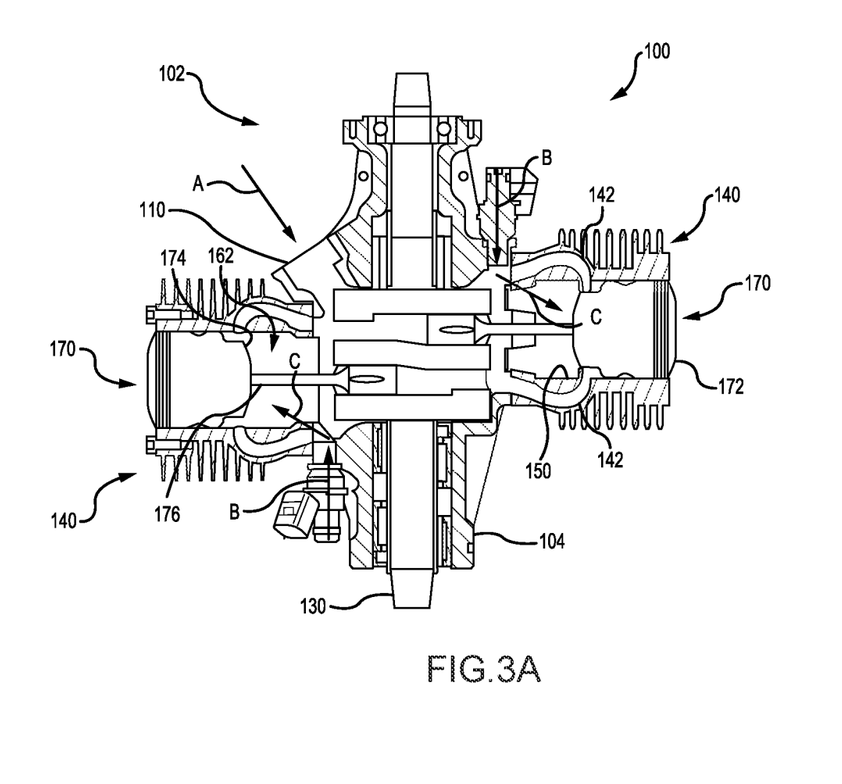
FIG. 3A is a cutaway view of a propulsion system engine for a UAV that utilizes heavy fuel injection and a corresponding fuel diverter.
Figure 3B:
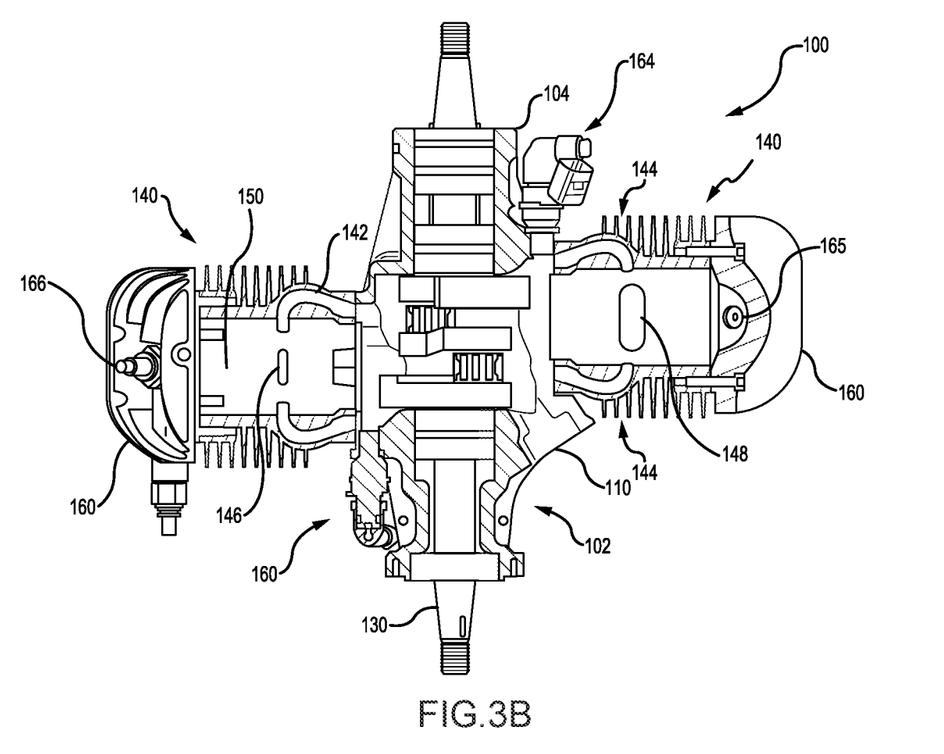
FIG. 3B is another cutaway view of the propulsion system engine of FIG. 3A, illustrating various ports for the engine cylinders that accommodate introducing an air/fuel mixture into and directing an exhaust out of a combustion chamber.
Figure 3C:
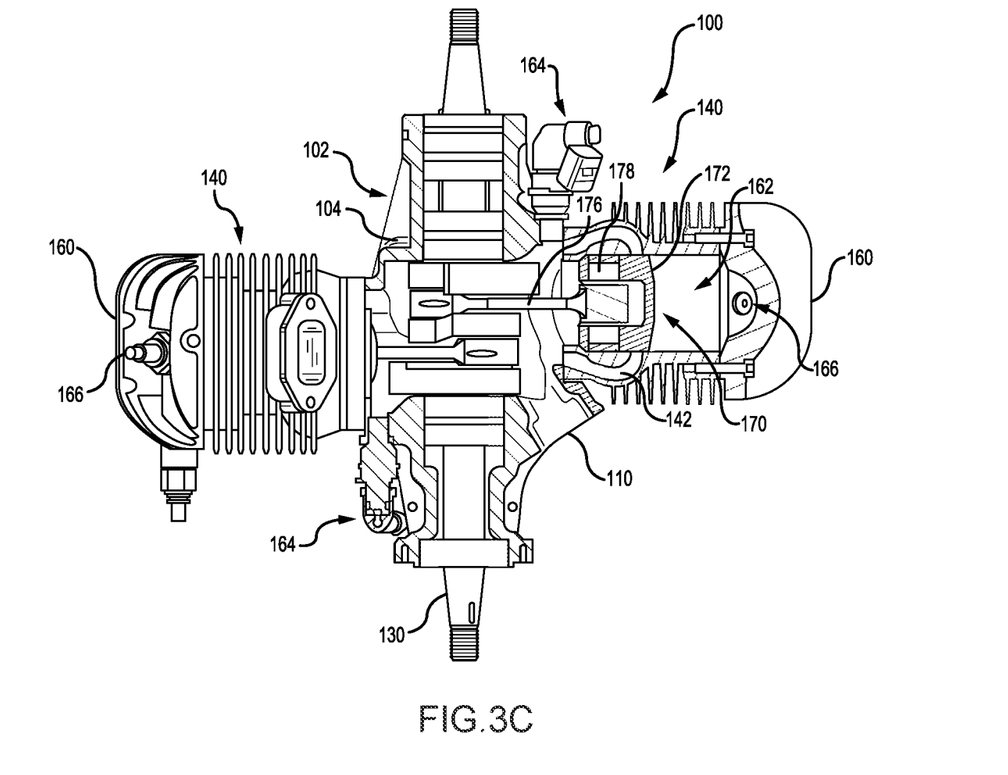
FIG. 3C is another cutaway view of the propulsion system engine of FIG. 3A, illustrating a piston being spaced from its top dead center position.

The illustrated engine 100 is of a two-cylinder configuration. A pair of cylinders 140 are disposed in at least generally opposing relation to one another and are each appropriately mounted to a crankcase housing 104 of a crankcase 102. Each cylinder 140 has a cylinder wall 150 (e.g., an annular or circular wall) within the interior of the cylinder 140 that defines at least in part a cylinder chamber 162. A piston 170 is disposed within each cylinder chamber 162 and is movable (e.g., axially; via reciprocation) relative to the corresponding cylinder wall 150. One or more piston rings may be mounted on a perimeter of each piston 170 for sealing-engaging its corresponding cylinder wall 150. A cylinder head 160 is appropriately mounted to each of the cylinders 140.

Figure 4A:
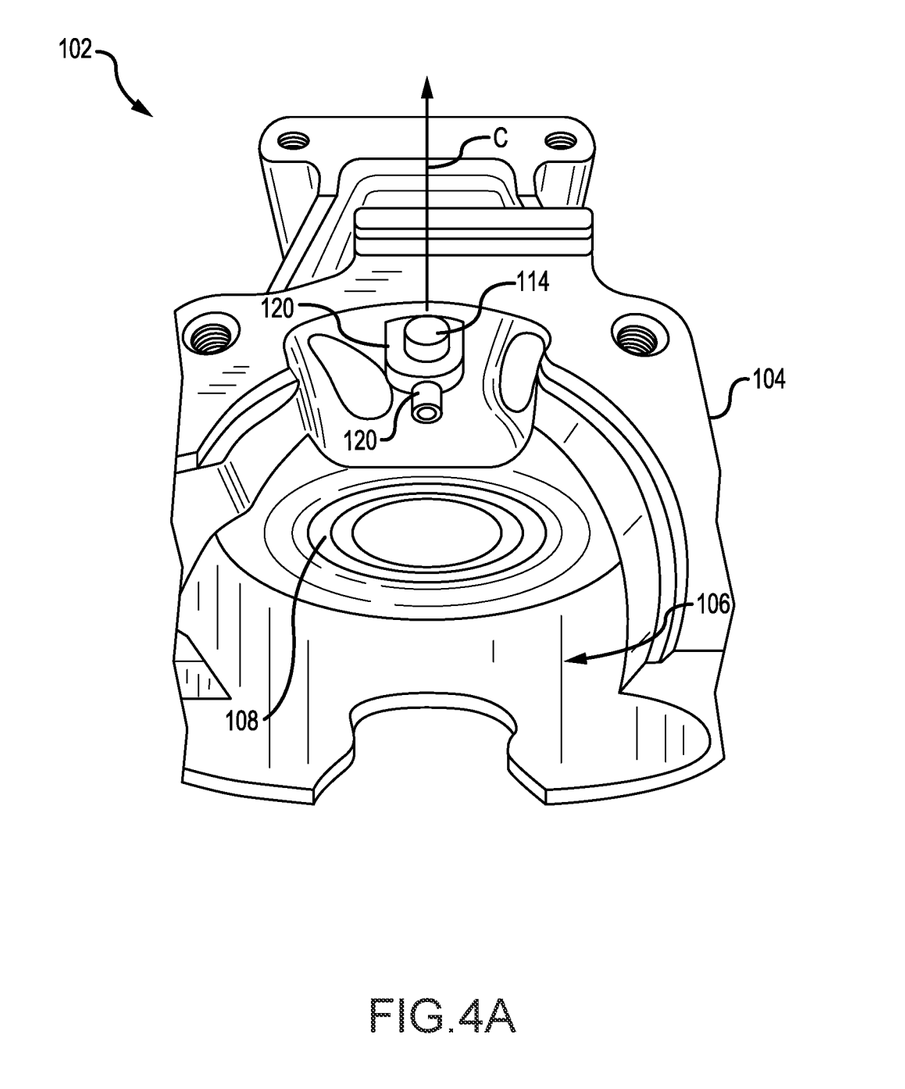
FIGS. 4A and 4B are perspective views of a fuel injection port and fuel diverter for injecting heavy fuel into a crankcase chamber for the propulsion system engine of FIGS. 3A-3C.
Figure 4B:
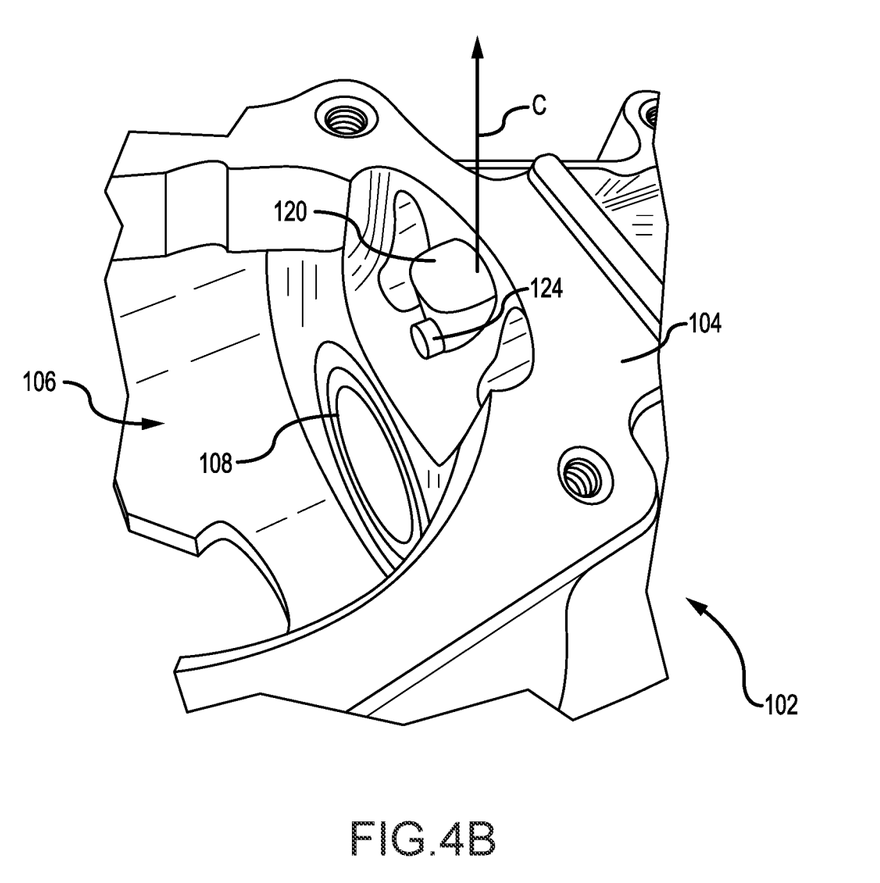
Figure 4C:
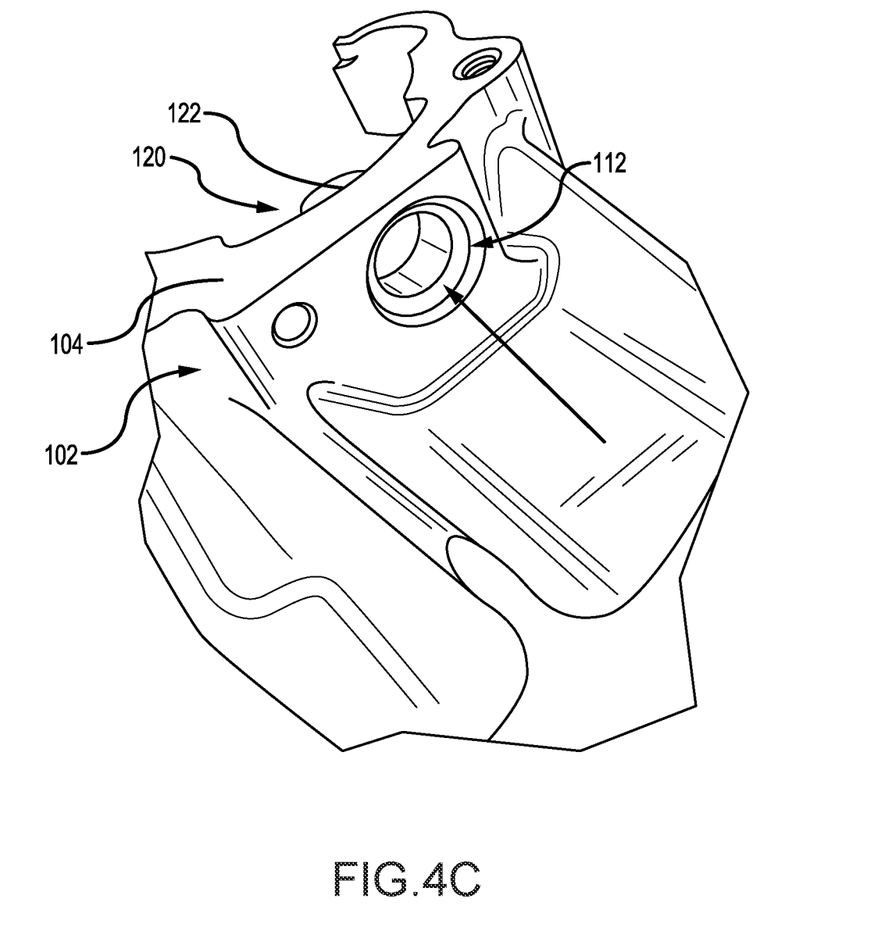
FIG. 4C is a perspective view of a fuel injector mounting in a crankcase housing for receiving a fuel injector that directs fuel into the fuel injection port shown in FIGS. 4A and 4B.

Reciprocation of each piston 170 relative to its corresponding cylinder 140 (e.g., along an axial path) is provided by a rotatable crankshaft 130 that is disposed within the crankcase housing 104 (more specifically the crankcase chamber 106), and that is rotatable relative to the crankcase housing 104 via a crankshaft bearing 108 (FIGS. 4A and 4B). A piston or connecting rod 176 extends between the crankshaft 130 and its corresponding piston 170. A bearing 178 may be utilized at the interconnection between the corresponding piston 170 and the crankshaft 130.

Each piston 170 includes a first piston surface 172 and a second piston surface 174 that are spaced from one another along the direction of motion of the piston 170 relative to its corresponding cylinder 140 (the surfaces 172, 174 of each piston 170 may be characterized as being axially spaced, as the piston 170 may be characterized as axially reciprocating within its corresponding cylinder 140). The first piston surface 172 of each piston 170 projects in the direction of the corresponding cylinder head 160, while the second piston surface 174 of each piston 170 projects in a direction that is away from its corresponding cylinder head 160 (or in the opposite direction compared to the first piston surface 172). The portion of the cylinder chamber 162 between the first piston surface 172 of each piston 170 and its corresponding cylinder head 160 is where combustion of an air/fuel mixture occurs during operation of the engine 100 (and hereafter may be referred to as the combustion chamber 162). The second piston surface 174 of each piston 170 fluidly interfaces with a crankcase chamber 106 in a manner that will be discussed below.

At least one fuel injector 164 (for the injection of a heavy fuel) and at least one spark plug 166 (for igniting an air/fuel mixture within the corresponding combustion chamber 162) is provided for each combustion chamber 162 of the engine 100. One or more air inlets 110 extend through the crankcase housing 104 to direct ambient/external air into the crankcase 102, more specifically a crankcase chamber 106 of the crankcase 102 (FIGS. 4A-4B) for operation of the engine 100. One or more ports extend through one or more of the crankcase housing 104 and the cylinder 140 to fluidly interconnect the crankcase chamber 106 with each of the combustion chambers 162, including one or more transfer ports 142, one or more boost ports 144, and/or one or more intake ports 146 (all for directing air into the corresponding combustion chamber 162), and one or more exhaust ports 148 for directing exhaust out of the corresponding combustion chamber 162. The various ports 142, 144, 146 may be sized, configured, and/or arranged to achieve one or more characteristics within the corresponding combustion chamber 162.

Arrow A in FIG. 3A is representative of the introduction of ambient/external air into the engine 100. Each arrow B in FIG. 3A is representative of the direction along which heavy fuel is initially injected by its corresponding fuel injector 164 (and into the crankcase chamber 106). Each arrow C in FIGS. 3A, 4A, and 4B is representative of the direction along which heavy fuel is diverted or redirected after entering the crankcase chamber 106. As will be discussed in more detail, heavy fuel is diverted or redirected within the crankcase chamber 106 at least generally in the direction of the second piston surface 174 of the corresponding piston 170.

The engine 100 may utilize any appropriate number of cylinders 140 and including a single cylinder 140. A two-cylinder configuration is illustrated and with the cylinders 140 being disposed in at least generally opposing relation to one another (e.g., including where the two pistons 170 are horizontally opposed). The two piston/connecting rods 176 extend in at least generally opposite directions from the crankshaft 130, with the two piston/connecting rods 176 engaging different locations that are spaced along the length dimension of the crankshaft 130 for the illustrated configuration.

The engine 100 is of a two-cycle configuration. One cycle is a combined intake/compression cycle or stroke, and the other cycle is a combined expansion/exhaust cycle or stroke. Movement of a given piston 170 in its corresponding cylinder 140, and toward top-dead-center (TDC), results in air and/or an air/fuel mixture being directed into the corresponding combustion chamber 162 (at a location between the first piston surface 172 of the piston 170 and its corresponding cylinder head 160) and compresses the air/fuel mixture that is within the combustion chamber 162 (an intake/compression stroke). This movement of the piston 170 may also draw new air and/or an air/fuel mixture into the crankcase chamber 106. Actuation of the corresponding spark plug(s) 166 typically occurs when the piston 170 is at or near TDC. This ignites the air/fuel mixture within the combustion chamber 162 and initiates the expansion/exhaust stroke (moves the corresponding piston 170 toward bottom-dead-center (BDC)). As the piston 170 moves from TDC toward BDC: 1) exhaust gases are directed out of the exhaust port(s) 148 (after the piston 170 passes the corresponding exhaust port 148 to expose the same to the combustion gases within the combustion chamber 162); 2) air and/or an air/fuel mixture within the crankcase 102 (e.g., within the crankcase chamber 106) will be compressed; and 3) when the piston 170 moves past its corresponding boost port(s) 144, transfer port(s) 142, and/or intake port(s) 146 (so they are now exposed to the corresponding combustion chamber 162), air and/or an air/fuel mixture from the crankcase 102 will be forced through each of these ports (by the prior pressurization of the crankcase chamber 106) to introduce a new air/fuel mixture into the chamber combustion 162 and which may also assist in directing exhaust gases out of the combustion chamber 162. The two noted cycles thereafter repeat in accordance with the foregoing.

As noted, heavy fuel is injected into the crankcase chamber 106 and is then diverted or redirected by a corresponding fuel diverter 120 (that is disposed within the crankcase chamber 106 and that is appropriately mounted to the crankcase housing 104, such as by one or more fasteners 124). In this regard, a fuel injection port 114 extends through the crankcase housing 104. The crankcase housing 104 further includes a fuel injector mounting or receiver 112 for installation of a fuel injector 164 (see FIG. 4C). Heavy fuel output from the fuel injector 164 is directed into the fuel injection port 104, proceeds into the crankcase chamber 106, and is diverted or redirected by the corresponding fuel diverter 120 (at least part of the fuel diverter 120 being aligned with its corresponding fuel injection port 114). This is conveyed in FIGS. 3A, 4A, and 4B, and is schematically depicted in FIG. 5.

Figure 5:
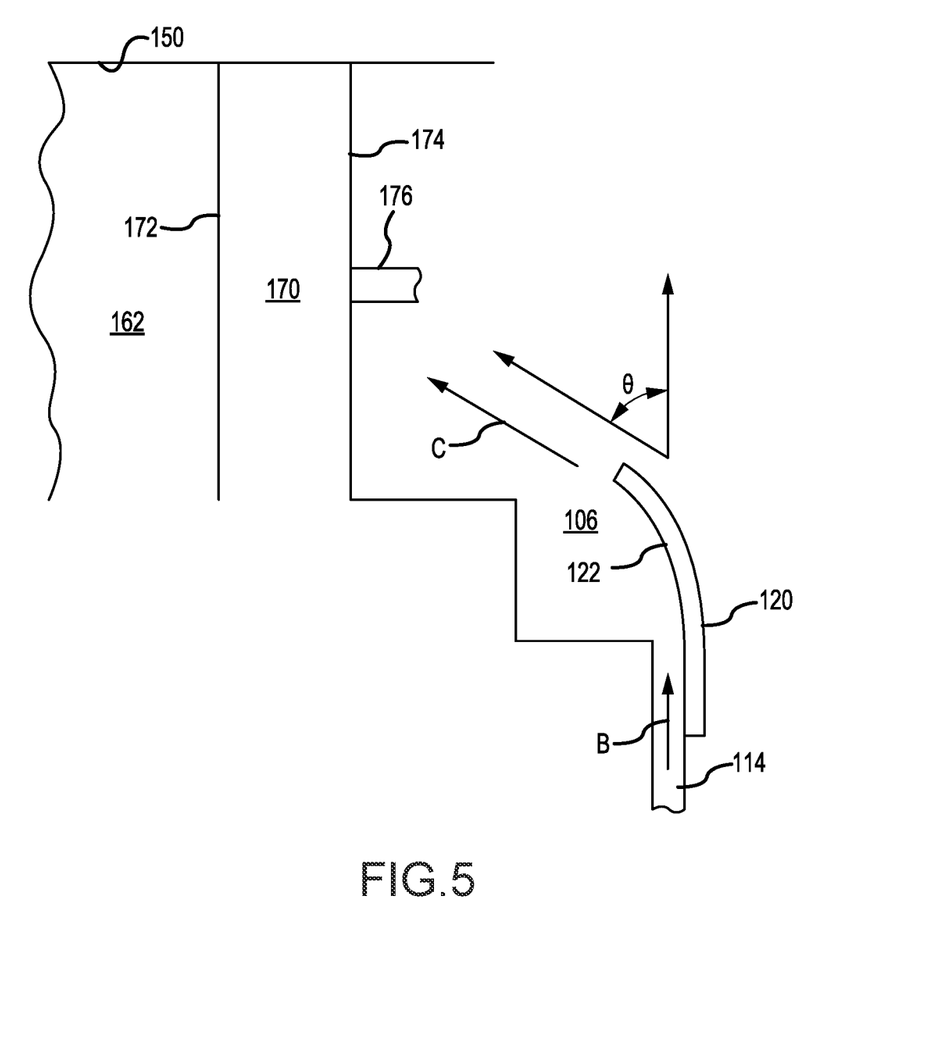
FIG. 5 is a schematic that illustrates a fuel diverter to divert heavy fuel into a cylinder at least generally in a direction of a back side of a piston.

Referring now primarily to FIG. 5, the flow of heavy fuel within the fuel injection port 114 is in a first direction that represented by the vector or arrow B. The arrow B may be parallel to the crankshaft within the crankcase 102. Heavy fuel exiting the fuel injection port 114 enters the crankcase chamber 106 and impacts a diverting surface 122 of the fuel diverter 120 (see also FIG. 4C)—the diverting surface 122 is aligned with its corresponding fuel injection port 114. The fuel diverter 120 thereafter directs the flow of heavy fuel in a second direction that is different than the above-noted first direction, and that is represented by the vector or arrow C. The heavy fuel may be characterized as being diverted or redirected within the crankcase chamber 106 through an included angle θ by the fuel diverter 120. This angle θ (the angle between the vectors B and C) may be at least about 30 degrees in one embodiment and at least 45 degrees in a second embodiment, may be within a range from about 0 degrees to about 45 degrees in one embodiment, may be within a range from about 45 degrees to about 90 degrees in one embodiment, may be within a range of 30 degrees and 60 degrees in another desirable embodiment, and may be within the range of 0 degrees to about 90 degrees in another useful embodiment. This diversion or redirection of the flow of heavy fuel exiting the fuel injection port 114, and within the crankcase chamber 106, may also be characterized as diverting or redirecting the flow of heavy fuel at least generally toward the second piston surface 174 (e.g., the bottom or back side back side of the piston 170, which tends to be at an elevated temperature during operation of the engine 100). The second piston surface 174 of each piston 170 is that surface that interfaces with the crankcase chamber 106 and is also that surface that is oppositely disposed to the surface of the piston 170 that interfaces with the combustion chamber 162 (the first piston surface 172).

There are a number of benefits associated with the above-described diversion or redirection of the flow of heavy fuel within the crankcase chamber 106, including without limitation: 1) improved heavy fuel engine operation due to fuel distribution; 2) improved lubrication of the bearing 178 between the piston 170 and its corresponding piston or connecting rod 176; 3) reduction of carbon buildup on the second piston surface 174 due to the associated cooling of the second piston surface 174 (carbon buildup on the piston 170 can adversely affect one or more aspects of the operation of the engine 100, such as engine performance degradation from carbon build up on piston rings and the underside of the piston crown); 4) improved vaporization of heavy fuels for two cycle or two-stroke engine applications, for instance by taking advantage of enhanced heat transfer from the piston 170 to the fuel impacting its second piston surface 174; 5) improved heavy fuel operation characteristics (e.g., power output, brake specific fuel consumption, achievable RPM and mixture ratio balance between cylinders, and the like) without the complexity of direct injection (injection of fuel directly into the combustion chamber 162) or other fuel vaporization methods; 6) cooling of the piston 170 for the subsequent combustion cycle, which is beneficial in that it maintains piston to cylinder clearances and heat rejection to maintain material strength and durability for overall longevity of the engine and components; 7) reducing combustion byproduct build-up on the piston rings (where such a build-up may adversely affect movement of the piston 170 within its corresponding cylinder 140); 8) controlling loading for multi-cylinder applications (e.g., provides for a more even distribution of fuel into each cylinder—without using the fuel diverter, fuel would tend to pool in the crankcase and this fuel would tend to go more into one cylinder versus the other cylinder); 9) providing for an increased amount of time that the fuel has to heat up and be distributed in the fuel air charge before being introduced into a combustion chamber 162; 10) providing smaller droplet sizes for the fuel; and 11) providing the ability to inject more fuel into vapor mixture with longer dwell times than direct injection.

The foregoing description of the present disclosure has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. The embodiments described hereinabove are further intended to explain best modes known of practicing the invention and to enable others skilled in the art to utilize the invention in such, or other embodiments and with various modifications required by the particular application(s) or use(s) of the present disclosure. It is intended that the appended claims be construed to include alternative embodiments to the extent permitted by the prior art.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

What is claimed is:

1. A crankcase for a UAV internal combustion engine, comprising: a crankcase housing comprising a crankcase chamber; a fuel injection port extending through said crankcase housing to said crankcase chamber; a fuel diverter comprising a diverting surface disposed within said crankcase chamber and aligned with said fuel injection port; wherein the fuel diverter is configured to direct all the fuel in a single direction, wherein during operation fuel is injected into said crankcase chamber in a first direction that corresponds with a first vector, wherein the fuel is diverted, by said diverting surface, in a second direction that corresponds with a second vector, wherein the fuel diverter is fixed such that the second direction is fixed, wherein said second direction is different from said first direction, and a propellor hub mounted to a crankshaft an adapted to receive a propellor.

2. The crankcase of claim 1, wherein said fuel diverter is directly machined into or detachably mounted to said crankcase housing.

3. The crankcase of claim 1, further comprising a fuel injector fluidly connected with said fuel injection port.

4. The crankcase of claim 1, wherein the fuel is diverted through an angle of at least about 45 degrees and that corresponds with an included angle between said first vector and said second vector.

5. The crankcase of claim 1, wherein the fuel is diverted through an angle within a range from about 0 degrees to about 45 degrees and that corresponds with an included angle between said first vector and said second vector.

6. The crankcase of claim 1, wherein the fuel is diverted through an angle within a range from about 45 degrees to about 90 degrees that corresponds with an included angle between said first vector and said second vector.

7. A UAV internal combustion engine, comprising: a crankcase comprising a crankcase housing, wherein said crankcase housing comprises a crankcase chamber; a fuel injection port extending through said crankcase housing to said crankcase chamber; a fuel diverter comprising a diverting surface disposed within said crankcase chamber and aligned with said fuel injection port; a cylinder mounted to said crankcase housing; a piston disposed within and movable relative to said cylinder, wherein said piston comprises a first piston surface and a second piston surface that are oppositely disposed, wherein said second piston surface fluidly interfaces with said crankcase chamber; wherein during operation said diverting surface directs substantially all fuel, discharged into crankcase chamber through said fuel injection port, at least generally in a fixed single direction of said second piston surface, wherein during operation fuel is injected into said crankcase chamber in a first direction that corresponds with a first vector, wherein the fuel is diverted, by said diverting surface, in a second direction that corresponds with a second vector, wherein the fuel diverter is fixed such that the second direction is fixed, wherein said second direction is different from said first direction, and a propellor hub mounted to a crankshaft an adapted to receive a propellor.

8. The UAV internal combustion engine of claim 7, wherein said engine is of a two-cycle configuration.

9. The UAV internal combustion engine of claim 7, wherein said fuel diverter is detachably mounted to said crankcase housing.

10. The UAV internal combustion engine of claim 7, further comprising a fuel injector fluidly connected with said fuel injection port, wherein during operation fuel discharged by said fuel injector is directed into said crankcase chamber through said fuel injection port.

11. The UAV internal combustion engine of claim 7, wherein said first surface of said piston fluidly interfaces with a combustion chamber, and wherein during operation an air/fuel mixture is directed from said crankcase chamber, through at least one port, and into said combustion chamber.

12. A UAV propulsion system, comprising: an internal combustion engine comprising: a crankcase comprising a crankcase housing, wherein said crankcase housing comprises a crankcase chamber; a fuel injection port extending through said crankcase housing to said crankcase chamber; a fuel diverter comprising a diverting surface disposed within said crankcase chamber and aligned with said fuel injection port; a cylinder mounted to said crankcase housing; a piston disposed within and movable relative to said cylinder, wherein said piston comprises a first piston surface and a second piston surface that are oppositely disposed, wherein said second piston surface fluidly interfaces with said crankcase chamber; wherein during operation said diverting surface directs substantially all the injected fuel at least generally in a fixed single direction of said second piston surface; wherein during operation fuel is injected into said crankcase chamber in a first direction that corresponds with a first vector, wherein the fuel is diverted, by said diverting surface, in a second direction that corresponds with a second vector, wherein the fuel diverter is fixed such that the second direction is fixed, wherein said second direction is different from said first direction; and a propeller hub mounted to said crankshaft and adapted to receive a propeller.

13. The UAV propulsion system of claim 12, wherein said engine is of a two-cycle configuration.

14. The UAV propulsion system of claim 12, wherein said fuel diverter is detachably mounted to said crankcase housing and further comprising a fuel injector fluidly connected with said fuel injection port.

15. The UAV propulsion system of claim 12, further comprising a propeller mounted to said propeller hub.

16. A UAV propulsion system, comprising:
an internal combustion engine comprising:
a crankcase comprising a crankcase housing, wherein said crankcase housing comprises a crankcase chamber;
a fuel injection port extending through said crankcase housing to said crankcase chamber;
a fuel diverter comprising a diverting surface disposed within said crankcase chamber and aligned with said fuel injection port;
a cylinder mounted to said crankcase housing; and
a piston disposed within and movable relative to said cylinder, wherein said piston comprises a first piston surface and a second piston surface that are oppositely disposed, wherein said second piston surface fluidly interfaces with said crankcase chamber;
wherein during operation said diverting surface directs fuel at least generally in a direction of said second piston surface;
a propeller hub mounted to said crankshaft and adapted to receive a propeller,
wherein during operation fuel is injected into said crankcase chamber in a first direction that corresponds with a first vector, wherein the fuel is diverted, by said diverting surface, in a second direction that corresponds with a second vector, wherein the fuel diverter is fixed such that the second direction is fixed, wherein said second direction is different from said first direction, and wherein the fuel is diverted through an angle of at least about 45 degrees and that corresponds with an included angle between said first vector and said second vector.

17. The UAV propulsion system of claim 16, comprising wherein said engine is of a two-cycle configuration.

18. The UAV propulsion system of claim 16, wherein said fuel diverter is detachably mounted to said crankcase housing and further comprising a fuel injector fluidly connected with said fuel injection port.

19. The UAV propulsion system of claim 16, further comprising a propeller mounted to said propeller hub.

* * * * *